United States Patent [19]

Whittle

[11] 4,363,476

[45] Dec. 14, 1982

[54] HAND TOOL ACTUATOR

[76] Inventor: William C. Whittle, 1052 Bonner Ct., La Verne, Calif. 91750

[21] Appl. No.: 207,136

[22] Filed: Nov. 17, 1980

[51] Int. Cl.[3] .............................................. B23Q 3/02

[52] U.S. Cl. ...................................... 269/96; 269/228; 72/451

[58] Field of Search ........................ 269/96, 228, 2, 43; 72/451

[56] References Cited

U.S. PATENT DOCUMENTS

| | | | |
|---|---|---|---|
| 274,232 | 3/1883 | Thayer et al. | 269/96 |
| 1,336,755 | 4/1920 | Parmelee | 269/96 |
| 2,535,450 | 12/1950 | O'Malley | 269/43 |
| 2,971,411 | 2/1961 | Dull | 269/96 |
| 3,028,577 | 4/1962 | Strauss | 269/228 |
| 4,089,513 | 5/1978 | Mark | 269/96 |

FOREIGN PATENT DOCUMENTS

| | | | |
|---|---|---|---|
| 3748 | of 1974 | Canada | 269/96 |

*Primary Examiner*—Robert C. Watson
*Attorney, Agent, or Firm*—Wagner & Bachand

[57] ABSTRACT

A hand tool adapter for bench operation comprising a frame including a cradle adapted to receive one handle of a two-handle hand operated tool. The adapter includes apparatus for securing the handle in place in relatively fixed relationship with the base. An actuator arm is coupled via a linkage to the base and includes a receiver for the other handle of the hand operated tool. The base positions the jaws or working portion of the hand tool to the front of the base available for clearer visibility by the operator. The linkage provides mechanical advantage for the operator to minimize and tend to standardize the force required for actuation of the hand tool. The handle of the apparatus is dimensioned and positioned to provide a clearly defined range of movement from unoperated to operated positions. An adjustable stop limits travel of the operating handle.

4 Claims, 10 Drawing Figures

HAND TOOL ACTUATOR

BACKGROUND OF THE INVENTION

From the first days of manufacture of hand tools, particularly those of a gripping type, the operator usually grips the tool with one hand and the work piece with the other. Typically he holds the work piece and tool in front of his chest, where he may readily view the work and where his hand is capable of applying a high degree of force.

In recent years a number of hand operated tools have been developed employing internal force limiting springs and the like designed to provide measured force to a pair of jaws for example used for crimping electronic terminals onto wires. There has been a stress on the use of force limiting tools and those having a minimum force before which the tool will release in order to improve the reliability of electrical connections so manufacturered. In certain cases, rather complex hydraulically and pneumatically actuated tools have been developed but these have proved to be quite expensive and in fact in most cases too expensive for assignment for each individual worker. Therefore hand tools have persisted for this type application. The power actuated tools have a further disadvantage that despite regulated hydraulic or pneumatic pressure, mis-location of the work piece or other variations can damage the terminal so that in fact the hand tool properly used by an assembly personnel can provide more reliability in products than the power actuated type.

One disadvantage of the hand tool is the fact that continued and repeated use of the tool is quite tiring to the worker and in certain cases the handles, in their unoperated positions, are so far apart that merely grasping the tool to begin the actuation step is a strain. This is a situation where hand operated tools are desired but assistance under manual control in which the force applied is actually manually generated is preferred. I have found that many tools, particularly electronic crimpers, are used by women with naturally smaller hands and grasp. In many instances two hands are required by female operators to actuate their tools leaving no hands to hold the work piece. This problem is eliminated by my invention.

Heretofore an effective bench modification for hand actuated gripping tools has not been provided.

Frequent tool recalibration, often required with power actuated tools, is not required using my invention.

BRIEF DESCRIPTION OF THE INVENTION

Given the foregoing state of the art, I have invented an improved bench or table mounted adapter for hand actuated gripping tools which overcomes each of the disadvantages noted above. The apparatus mounts a tool having a pair of jaws and a pair of handles which are compressed together to close the jaws with the jaws facing the operator available for clear view. The apparatus includes a base including at least a three point mount for positioning the apparatus temporarily or permanently on a bench or table. Clamp means cooperate with a channel like tool rest holding one handle securely attached to the base. A linkage of adjustable length is pivotedly connected to the base and a handle is similarly pivotedly connected to the linkage and to the second handle of the hand tool through a pivotable clamp. An adjustable stop and return spring serve to return and limit the movement of the handle upon release. The mechanical advantage afforded by the linkage and arm reduces the force required of the operator. Actuation requires only a simple retracting hand or arm movement. Force reductions of ten to one have been achieved using my invention.

DETAILED DESCRIPTION OF THE INVENTION

Figure 1:
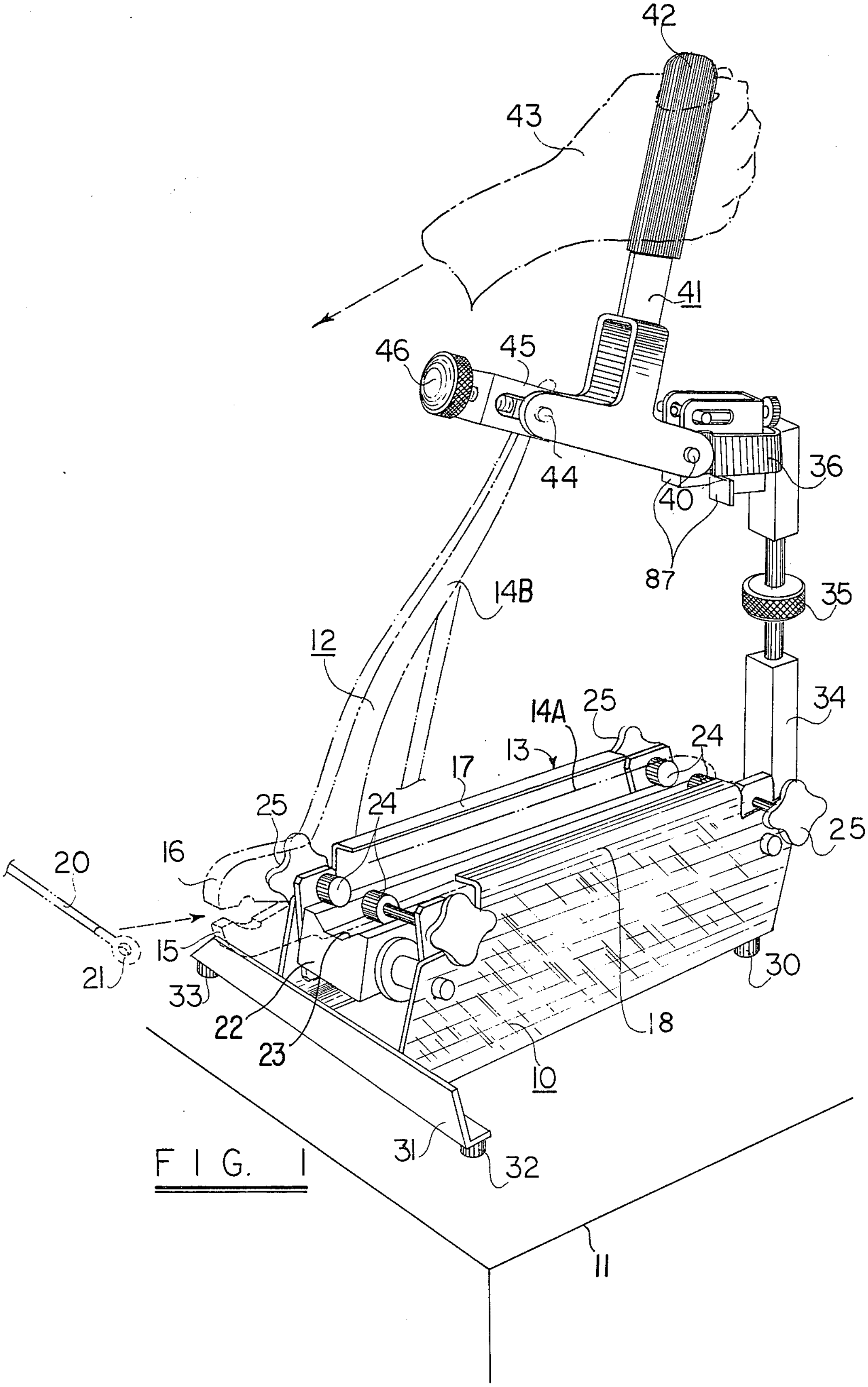
FIG. 1 is a perspective view of the hand tool actuator of this invention.

Now referring to FIG. 1, a typical installation of this invention may be seen showing the hand tool actuator 10 of this invention resting or mounted on a bench 11 and supporting a hand-operated tool 12 shown in interrupted lines including a first handle 14A which is secured in the base portion 13 of the actuator 10 and a second handle 14B extending upward. The handles 14A and 14B through suitable mechanism including an internal lock and force limiting device actuate a pair of jaws 15 and 16 having a predetermined shape designed to receive a wire 20 and terminal 21 for crimping. Again, the wire 20 and its terminal 21 are shown in interrupted lines.

The handle 14A rests in a pillow block or tool support 22 having a recessed upper surface 23 contoured to either meet a specific tool handle configuration or as shown in FIG. 1 a V-groove shape to receive a variety of tool handles. The handle 14A is secured between a plurality of clamp blocks 24 each having an individual screw actuator 25 which bring the clamp blocks 24 into clamping engagement with the handle 13 at two space points. One point of clamping on handle 14A is adjacent to the base of the jaws 15 and 16 while the second point clamping is toward the end of handle 14A. Securement of the tool at these two positions via the clamps 24 coupled with the alignment provided by the tool support block 22, the hand tool 12 is securely located within side walls 17 and 18 the actuator 10 of this invention.

As shown in FIG. 1 the hand tool actuator 10 has a rear foot 30 and a front cross bar 31 having a pair of spaced feet 32 and 33 which provide a broad three point support for the actuator 10 on the bench 11. Unshown in FIG. 1 are a pair of mounting holes in the front cross member 31 which may be used to mount the actuator on the bench 11 permanently. A similar mounting hole is located in the rear region, for example, through the rear foot 30.

Using either the weight of the actuator 10 and the frictional engagement of the feet 30, 32, and 33 or permanent mounting on the bench the operator can be assured of the solid positioning for his hand tool. This invention eliminates any need for having to pick up and hold the tool during its use.

Figure 4:
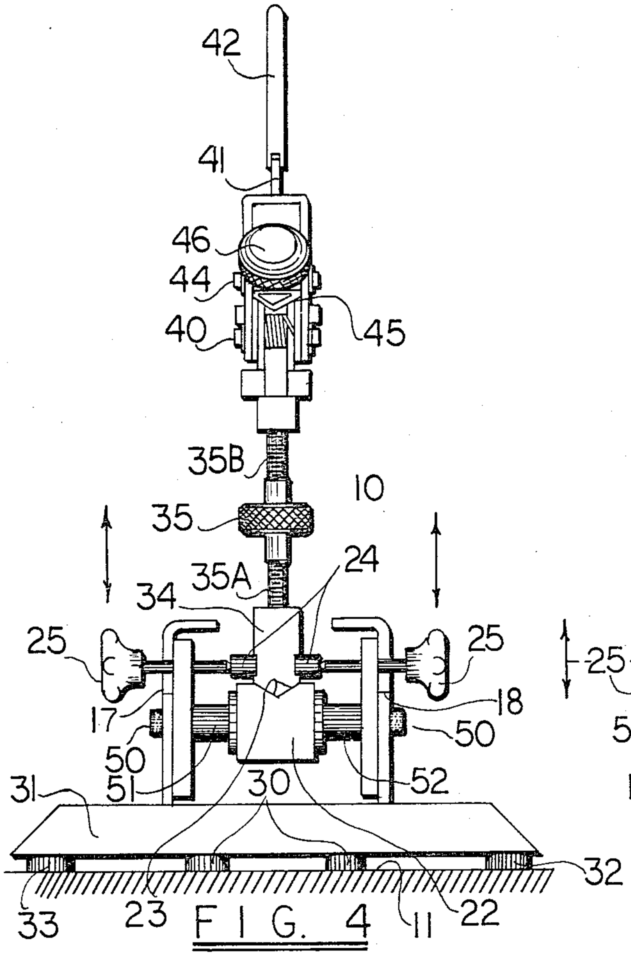
FIG. 4 is a front elevational view thereof.
Figure 6:
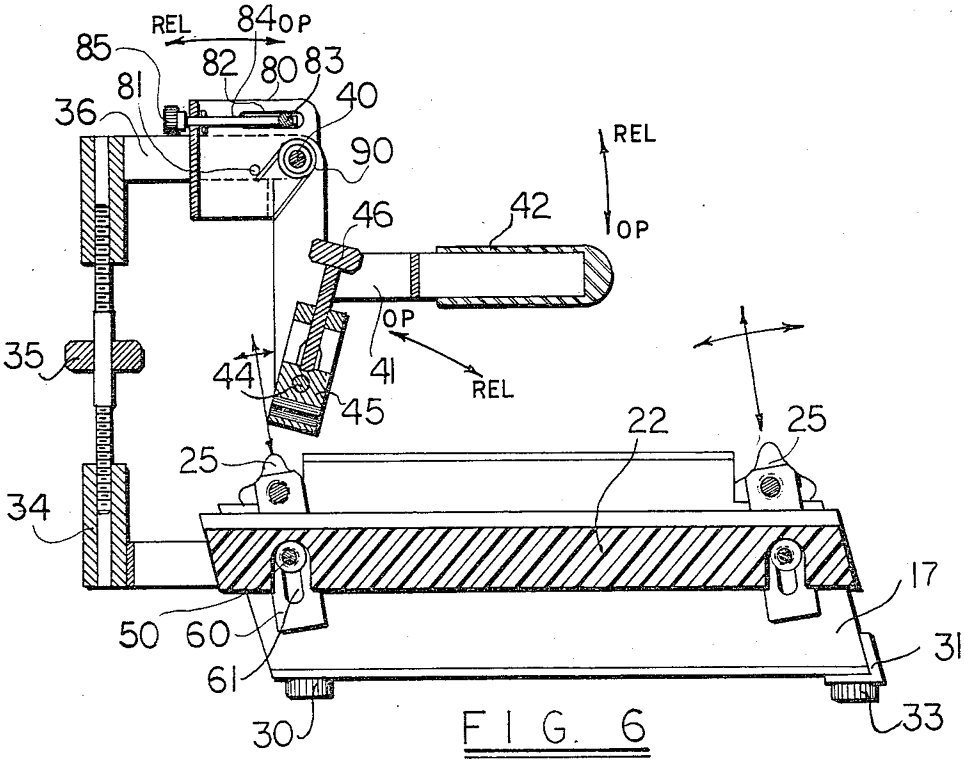
FIG. 6 is a vertical sectional view along the longitudinal axis thereof.

Pivotable mounted at the rear of the actuator is an arm or linkage 34 having a length adjusting screw 35 and a frontward extending arm 36. Pivotedly secured by a pin 40 to the arm 36 is a handle generally designed 41 including a pair of T-shaped sections and a grip 42 shown in the hand 43 of an operator. Also pivotably mounted from the handle 41 by pivot pin 44 is a clamp 45 having a clamp operating screw 46. Unshown in FIG. 1 but appearing in FIGS. 4 and 6, are a pair of jaws which are actuated by the clamp screw 46 to engage and hold the handle 14B. The clamp 45 is pivotably mounted so that upon actuation of the handle 41, it will follow the travel of tool handle 14B in the direction of the arrow and return at the completion of the operating stroke.

Figure 2:
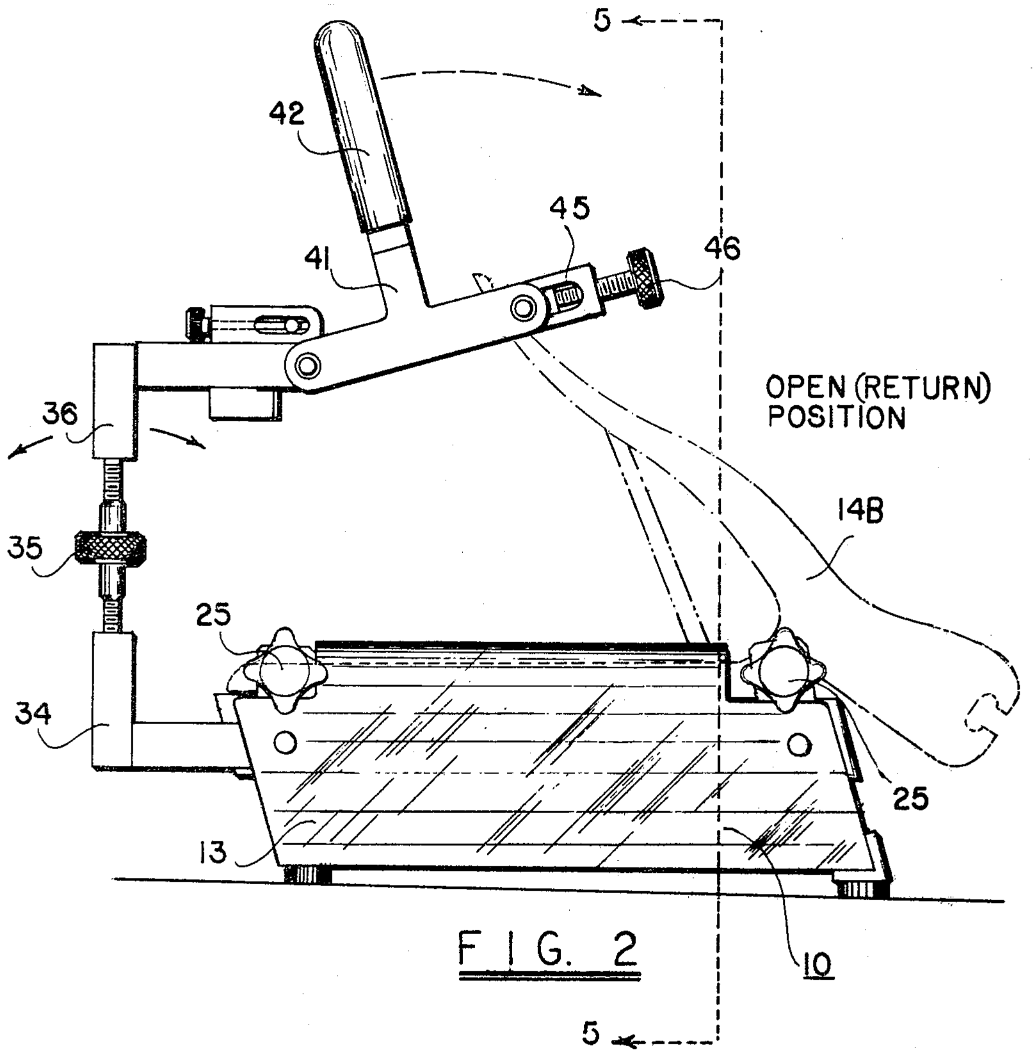
FIG. 2 is a side elevational view thereof in open position.
Figure 3:
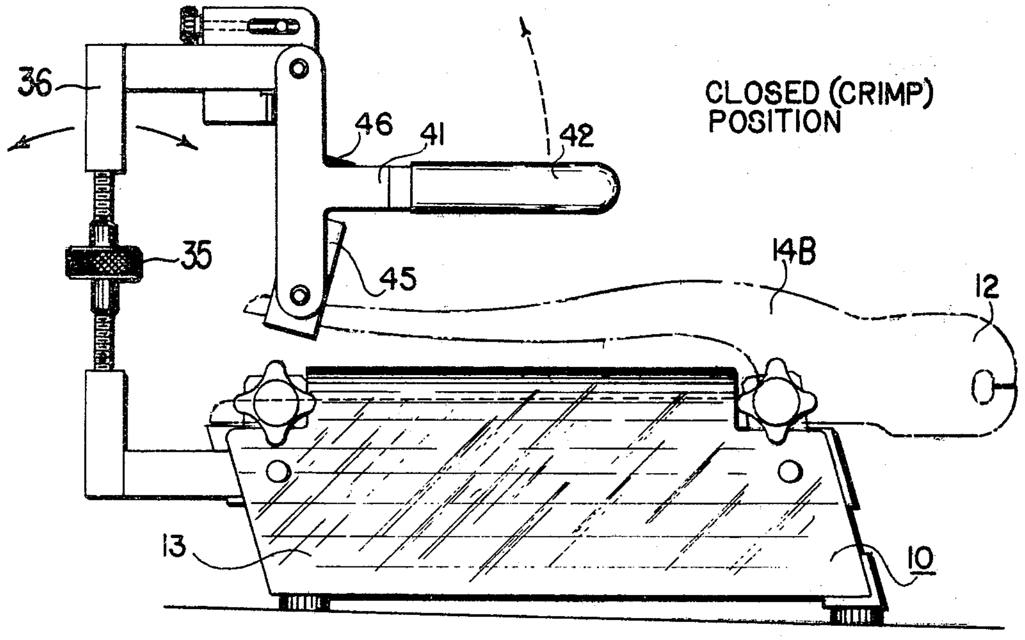
FIG. 3 is a side elevational view thereof in closed position.

In use, as illustrated in FIG. 1, in conjunction with FIGS. 2 and 3, the wire 20 and the terminal 21 are inserted in the jaws 15 and 16 by the operator while maintaining or holding the wire 20 and observing its positioning. He then reaches for grip 42 and draws it back in a natural movement causing the tool handle 14B to be rotated downward to secure a terminal 21 to the wire 20. The downward extent of travel of the tool handle 14B and thus the grip 42 as illustrated in FIG. 3 determined by the internal stop of the tool 12, and stop 87 which in most cases include a locking mechanism which prevents the release of the handle until the hand tool stop has been reached to insure a complete crimping. The adjusting stud 35 is adjusted so that the fixed stop 87 is contacted and the hand tool releases at the same time. In the past the operator has had to listen for the audible click, or judge the degree of resistance to detect completion of operation of the tool. Employing my invention, the operator calibrates the actuator by adjustment of screw 85 until engagement of stop 87 and built in tool release coincide. Thereafter he need only actuate the handle 42 to the stop 87 and release. Consistent and exact crimping results with each operation cycle. Particular tools for which this invention has been used to date include:

| MANUFACTURER | TOOL DESIGNATION |
|---|---|
| Cannon ITT | M22520/1-01 |
| 66 East Dyer Road | M2252/2-01 |
| Santa Ana, CA 92702 | CCT/D C/1&2 |
| Hollingsworth | H-3 |
| 85 Benjamin Franklin Highway | H-6E |
| PO Box 499 | H-8 |
| Potstown, PA 19464 | H-12 |
| | H-9 |
| | H-21C |
| | H-46 |
| Ideal Industries, Inc. | 83-001 |
| Sycamore, Illinois 60178 | |
| Panduit | CT-500 |
| 17301 Ridgeland Avenue | CT-550 |
| Tinley Park, Illinois 60477 | CT-570 |

Figure 7:
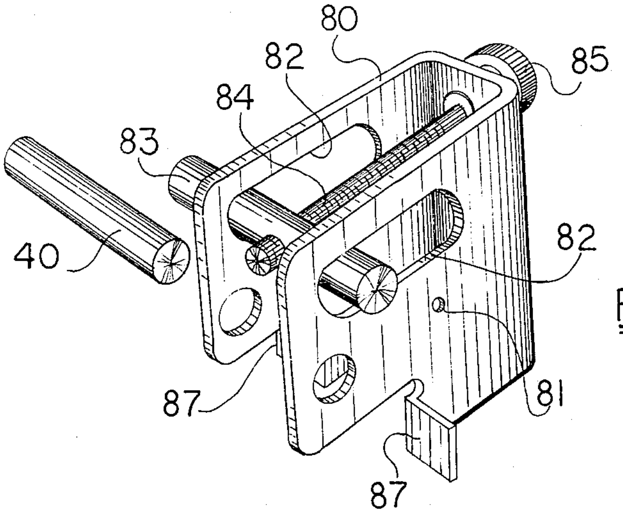
FIG. 7 is a perspective view of the adjustable stop thereof.

This invention includes an adjustable return stop coupled between the arm 36 and handle 41 which limits the release travel of tool handle 41 and consequently handle 14. Since the tool 12 often does not have an adjustable outer limit other than the mechanical stop or beyond the normal grasping size, it is desirable that the actuator of this invention include a suitable stop to avoid unnecessary return travel and unnecessary travel on actuation up to the point of commencing crimp tool operation. This adjustable stop is best shown in FIGS. 6 and 7.

Now referring to FIG. 4, the relative positioning of the elements of this invention from the front or operator's view are apparent. The broad base for mounting on the work surface 11 is defined by the feet 30 at the rear plus the feet 32 and 33 extending downward from the front cross support 31. The side member 17 is duplicated by its matching side member 18 which define the channel in which the tool support 22 rests on a transverse pin 50 centered by a pair of spacers 51 and 52. The upper surface recess 23 in block 22 allows the cradling of one handle of the tool effectively if the shape is curved or circular as usually is the case. The adjustment screw 35 for adapting the apparatus to different tools and setting degree of closure (squeeze) is clearly shown at the rear and particularly employing two reversed threaded portions 35*a* and 35*b* which allow a single direction rotation of the knob 35 to produce double the thread pitch adjustment of the height of the free handle capturing portions of the apparatus, namely, the arm 36 T-shaped handle 41 and the tool clamp 45.

Figure 5:
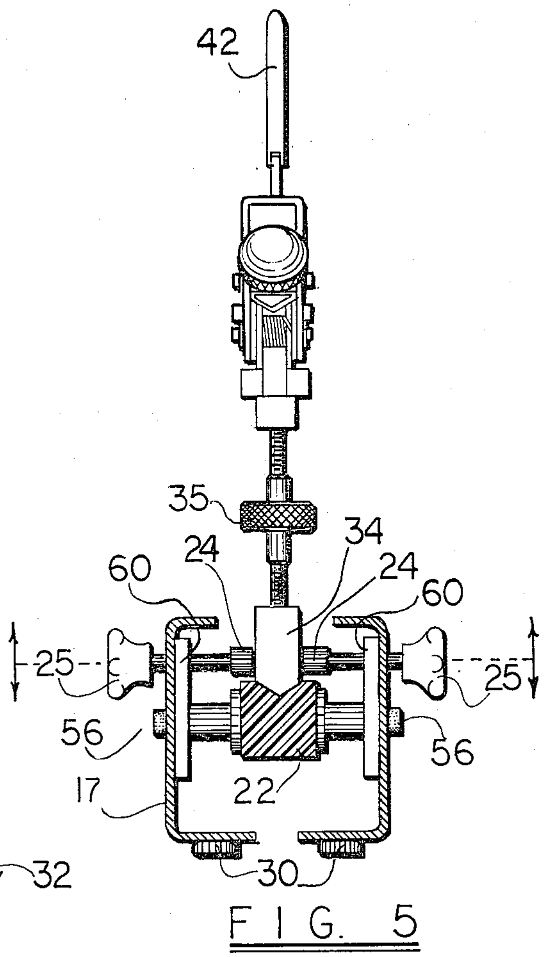
FIG. 5 is a vertical sectional view taken along 5—5 of FIG. 2.

FIGS. 4 and 5 illustrate one adjustable aspect of this invention whereby the height of the adjustment screws 25 may be changed merely by loosening the retaining screws 56 which hold the pins 50 in place and sliding any of four bars 60 upward. These bars 60 carry the adjustment screw 25. This feature is also illustrated in the sectional view FIG. 6. The bars 60 are adjustable not only by movement in their slot 61 shown in FIG. 6 but may be pivoted in order to move the clamp plates 24 into registry with the handle of the tool to be supported at the most appropriate place. This feature allows the actuator of this invention to adjust readily to broad variety of hand actuated crimping tools.

Now referring to FIG. 6 the nature of the actuating mechanism is clearly shown as including a U-shaped link made up of the arm 34 adjustment screw 35, bracket 36, which act as a single member pivoted about the pin 50. Joining that U-shaped link member 34–36 is U-shaped handle 41 which acts as a rotatable arm between pivot points 40 and 44. Clamp 45 pivotally connects the handle 41 to the tool handle 14B.

Given this arrangement the actuation of the handle 41 allows the U-shaped link member 34–36 to pivot rearwardly while the handle 41 pivots downward and rearward and the clamp 45 pivots to compensate for the normal arcuate travel of the handle 14 of the tool in moving from a full open to a full locked or operated position. Release of the handle 41 by the operator causes a reversal of the path of the link U-shaped link 34–36 the handle 41 and the clamp 45. Given this three member link arrangement the actuator of this invention is fully effective with hand tools having a variety of handle lengths and shapes degrees of travel between full open and full closed position and shape or angle of the handles. In fact in FIG. 1 the tool has the common reverse bend at the end of the handle. Given the pivotal connection of the clamp 45 any such shape offers no difficulty in mounting or smooth actuation of the tool.

By controlling the degree of hand tool closure with stop 87 and adjusting stud 35, consistent and exact crimping results with each cycle. Normally judgment is required by the operator to determine when the hand tool will open. This invention eliminates that judgment step.

Figure 8:
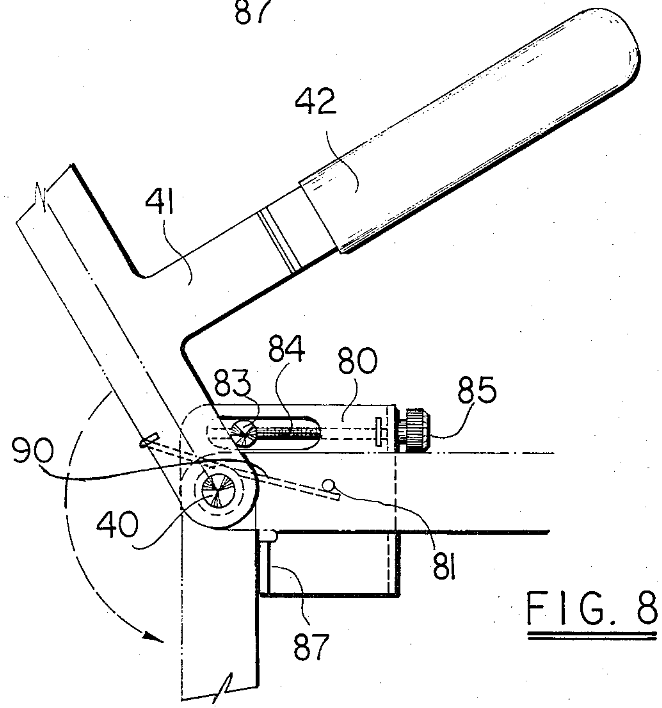
FIG. 8 is a fragmentary side elevational view of the adjustable stop of FIG. 1 and handle subassembly.

Refer now to FIGS. 7 and 8 showing the adjustable stop of this invention. It employs the U-shaped bracket 80 secured to the arm 36 by pin 40 and pin 81 having a pair of elongated slots 82 in which the adjustable stop pin 83 travels under the control of knob 85 and its associated adjusting screw. Rod 83 is threaded whereby it advances and returns upon rotation of the knob 85. The bracket 80 includes a pair of externally extending wings or stops 87 one of which appears in FIG. 7. These stops are fixed and then act as the ultimate limit to the operating stroke, when the T-shaped head of the handle 41 strikes the pair of wings 87. Return spring 90 encircles pin 40 and engages the handle 41 and bracket 36 at stop pin 81 providing a return bias.

Figure 9:
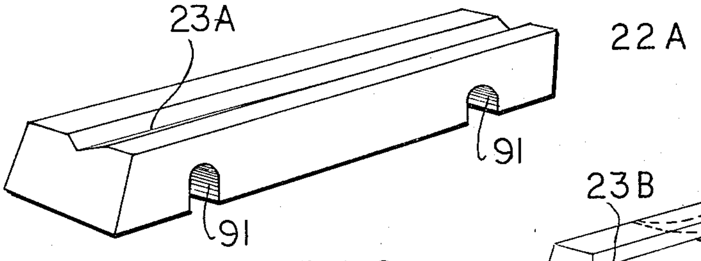
FIGS. 9 and 10 are perspective views of two embodiments of the pillow block thereof.
Figure 10:
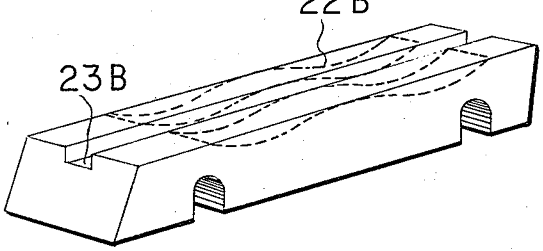

The adaptability of this invention is additionally illustrated in FIGS. 9 and 10. These figures show two different versions of the support block 22 of the previous figures. In this case in FIG. 8 support block **22*a* is shown to be a solid block of plastic material having a V groove 23*a* in the upper surface and a pair of notches 90 and 91 extending transversely across the lower region of the block. In FIG. 10 the support block 22*b* is substantially identical with that of 22 and 22*a* with the exception that it has a milled rectangular groove 23*b* in the upper surface designed to take a rectangular shaped handle or part of the squeezeable tool or merely to act as a centering guide. The particular shape of the groove or recess 23 depends upon the particular tool to be used. I have found that the triangular groove 23*a* of FIG. 8 serves to cradle most hand tool handles and coupled with the firm engagement by the locking screws 25 and pressure pads 24 the tool is securely held in place. The blocks 22 may be band sawed to a particular shape as noted by the dashed lines in FIG. 10** using normal shop equipment to match unusual handle designs if desired. Additional height is provided as surplus machinable material.

Incorporating this invention I have found that a large variety of tools can be used interchangeably in the adapter merely by loosening five clamping screws—four on the base and one on the clamp 45 and inserting the required tool. It should be note that the support block 22 rest on the pins 50 and can be allowed to move slightly laterally and slightly longitudinally for the best position in holding the tool. Tightening of the screws 56 can serve to position the block 22 rigidly. This is usually desired once the proper adjustments for the particular tool have been made.

From the foregoing discussion it may be seen that I have developed a bench adapter for hand tools which provides a solid mounting for hand tools with the working jaws directly ahead in position of good visibility for the operator. The operation of the hand tool after installation is affected merely by drawing a handle foward until it reaches its own internal stop and stop 87 and release of this apparatus. The tool is inserted in a matter of a few seconds and when properly installed becomes virtually an integrated part of the actuator. Thereafter reliable operation of the jaw can be assured. Removal and exchange of tools again takes just a few seconds. The adapter may be permanently secured to a bench or as well located by its triangular support rubber feet.

The above described embodiments of this invention are merely descriptive of its principles and are not to be considered limiting. The scope of this invention instead shall be determined from the scope of the following claims, including their equivalents.

What is claimed is:

1. A bench adapter for hand operated squeeze type tools comprising a base adapted to be supported by a work surface;

said base defining a longitudinal channel;

clamp means for securing one handle of a hand operated tool in said channel with the working portions of the hand tool extending out of the channel into a work position;

link means pivotally connected to said base for rotating about a generally horizontal axis;

handle means pivotally connected to said link means;

clamp means pivotally connected to said handle means;

said clamp means adapted to receive a second handle of the tool to be actuated;

said handle including an extended portion adapted to be manipulated by the operator to pivot said clamp, said handle, and said link to advance the second handle of the work tool toward the first handle thereof to operate the tool;

wherein said link means includes means for adjusting the length thereof to vary the extent of travel of the second handle of the tool.

2. The combination in accordance with claim 1 wherein said base includes a longitudinally extending block, removable from said base and of plastic material and fabricatable to conform to the shape of the handle of the tool to be held in said bench adapter and thereby defining a recess for holding said first handle of the tool.

3. The combination in accordance with claim 1 including first stop means associated with said link for engaging said handle at the limit of actuating travel of the handle.

4. The combination in accordance with claim 3 including second stop means engaging said link and said handle for limiting the extent of return movement of the handle.

* * * * *